United States Patent
Riha et al.

(10) Patent No.: US 11,673,220 B2
(45) Date of Patent: *Jun. 13, 2023

(54) ADJUSTABLE FIXTURE TO POSITION PARTS FOR DIMENSIONAL MEASUREMENT

(71) Applicant: Ford Motor Company, Dearborn, MI (US)

(72) Inventors: Erik Riha, Dearborn, MI (US); Michael Dean Blodgett, Holland, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,715

(22) Filed: Sep. 8, 2021

(65) Prior Publication Data

US 2021/0402543 A1    Dec. 30, 2021

Related U.S. Application Data

(63) Continuation of application No. 16/223,929, filed on Dec. 18, 2018, now Pat. No. 11,123,833.

(51) Int. Cl.
| | |
|---|---|
| *B23Q 17/22* | (2006.01) |
| *B23Q 1/03* | (2006.01) |
| *B29C 64/245* | (2017.01) |
| *B33Y 80/00* | (2015.01) |
| *B33Y 10/00* | (2015.01) |

(52) U.S. Cl.
CPC ......... *B23Q 17/2216* (2013.01); *B23Q 1/032* (2013.01); *B23Q 1/037* (2013.01); *B29C 64/245* (2017.08); *B33Y 10/00* (2014.12); *B33Y 80/00* (2014.12)

(58) Field of Classification Search
CPC .......... B23Q 1/032; B23Q 1/037; B23Q 1/25; B23Q 1/40; B23Q 1/42; B23Q 1/48; B23Q 1/62; B23Q 1/66; B23Q 3/106; B23Q 3/107; B23Q 7/005; B23Q 16/00; B23Q 16/02; B23Q 16/06; B23Q 16/08; B23Q 16/10; B23Q 17/22; B23Q 17/2225; B23Q 17/2216; B23Q 17/2291; B23Q 2220/004; B23Q 2716/08; B29C 64/245

USPC ....................................... 269/289 r

See application file for complete search history.

(56) References Cited

U.S. PATENT DOCUMENTS

| | | | | |
|---|---|---|---|---|
| 5,305,992 | A * | 4/1994 | Kish ...................... | B23Q 1/035 269/274 |
| 8,061,018 | B2 * | 11/2011 | Stepanek ................ | G01F 23/00 29/760 |
| 8,998,191 | B2 * | 4/2015 | Gao ...................... | B62D 65/026 269/311 |

* cited by examiner

*Primary Examiner* — Monica S Carter
*Assistant Examiner* — Alberto Saenz
(74) *Attorney, Agent, or Firm* — Burris Law, PLLC (57) ABSTRACT

A locating fixture includes an adjustable locating member for supporting and restraining a part. The adjustable locating member allows for rotational and translational adjustment for aligning to a particular part configuration. The adjustable locating member utilizes a plurality of indicia and a position indicator to assist in the alignment of the adjustable locating member to a desired position, which is then restrained at a desired position by a restraining element.

20 Claims, 8 Drawing Sheets

ADJUSTABLE FIXTURE TO POSITION PARTS FOR DIMENSIONAL MEASUREMENT

CROSS-REFERENCE TO RELATED APPLICATION

This application is a continuation of and claims the benefit of U.S. application Ser. No. 16/223,929, filed Dec. 18, 2018, and titled "ADJUSTABLE FIXTURE TO POSITION PARTS FOR DIMENSIONAL MEASUREMENT," the content of which is incorporated herein by reference in its entirety.

FIELD

The present disclosure relates to a part locating fixture, or a check fixture/tool, and a method of locating and restraining a part for dimensional verification.

BACKGROUND

The statements in this section merely provide background information related to the present disclosure and may not constitute prior art.

Automobile body panels are typically manufactured utilizing a stamping process. These body panels have dimensional requirements, which are typically defined on a part print, to meet quality standards. The dimensional requirements may include profile, location of specific features on the body panels relative to a datum, and thickness(es), among others. Dimensions of the body panels are verified using check fixtures, which locate the body panels relative to datums, and dimensional measurement equipment such as a coordinate measurement machine (CMM) measures the key dimensions. Over time and with the variety of the parts being check, check, fixtures need to be shimmed to bring them back into tolerance and to accommodate different part numbers, which involves costly manual labor. Further, check fixtures need to be shimmed multiple times, thus adding to overall costs and downtime.

The present disclosure addresses issues related to the adjustment of locating fixtures that constrain parts during dimensional measurement.

SUMMARY

Generally, the present disclosure provides a locating fixture having an innovative adjustable locating member with a part locating feature and position indicator to position a part for subsequent measurement/verification.

In one form, a locating fixture is provided that comprises a base including a raised platform having a mounting aperture, an adjustable locating member disposed within the mounting aperture and including a part locating feature and a position indicator, a plurality of indicia located on the raised platform adjacent to the adjustable locating member, a restraining member cooperatively engaged with the adjustable locating member, and a clamp mounting area on the base.

In variations of this locating fixture, which may implemented individually or in any combination: the adjustable locating member is rotationally and translationally mounted within the mounting aperture; the locating fixture further comprises a stabilizing member secured to and extending adjacent a distal end of the adjustable locating member and received within a recess defined in the base; the restraining member comprises an opening in the raised platform extending from an edge through to the mounting aperture, and a securing member is adjustably mounted within the opening; the securing member comprises a bolt and a nut assembly; the part locating feature defines a geometry selected from the group consisting of flat, arcuate or pointed; at least the raised platform and the adjustable locating member are manufactured with an additive manufacturing process; the raised platform is elevated above the base to define a cavity between a lower portion of the raised platform and the base; the locating fixture further comprises a set of rails, wherein the locating fixture is translatably mounted between the set of rails; the set of rails are configured to allow for longitudinal and lateral directional translation of the locating fixture; the locating fixture further comprises a support member, wherein the set of rails and the locating fixture are translatable along the support member; and the locating fixture further comprises an adjustment feature to control lateral translation of the locating fixture.

In another form, an adjustable locating fixture comprises a base including a raised platform having a mounting aperture, an adjustable locating member disposed within the mounting aperture and including a part locating feature and a position indicator, wherein the adjustable locating member is rotationally and translationally mounted within the mounting aperture, a stabilizing member secured to and extending adjacent a distal end of the adjustable locating member and received within a recess defined in the base, a plurality of indicia located on the raised platform adjacent to the adjustable locating member, a restraining member cooperatively engaged with the adjustable locating member, and a set of rails, wherein the locating fixture is translatably mounted between the set of rails.

In variations of this locating fixture, which may implemented individually or in any combination: the set of rails are configured to allow for longitudinal and lateral directional translation of the locating fixture; the locating fixture further comprises an adjustment feature to control lateral translation of the locating fixture; the restraining member comprises an opening in the raised platform extending from an edge through to the mounting aperture, and a securing member is adjustably mounted within the opening; the part locating feature defines a geometry selected from the group consisting of flat, arcuate and pointed; and at least the raised platform and the adjustable locating member are manufactured with an additive manufacturing process In yet another form, an adjustable locating fixture comprises a base including a raised platform having a mounting aperture and a clamp mounting area configured to receive a part clamp, an adjustable locating member rotationally and translationally mounted within the mounting aperture and including a part locating feature and a position indicator fixedly attached to the adjustable locating member, a plurality of indicia located on the raised platform adjacent to the adjustable locating member, wherein the position indicator cooperates with the plurality of indicia to determine a vertical position along a longitudinal axis of the adjustable locating member, and a set of rails, wherein the locating fixture is translatably mounted between the set of rails.

In a variation of this locating fixture, the set of rails are configured to allow for longitudinal and lateral directional translation of the locating fixture.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
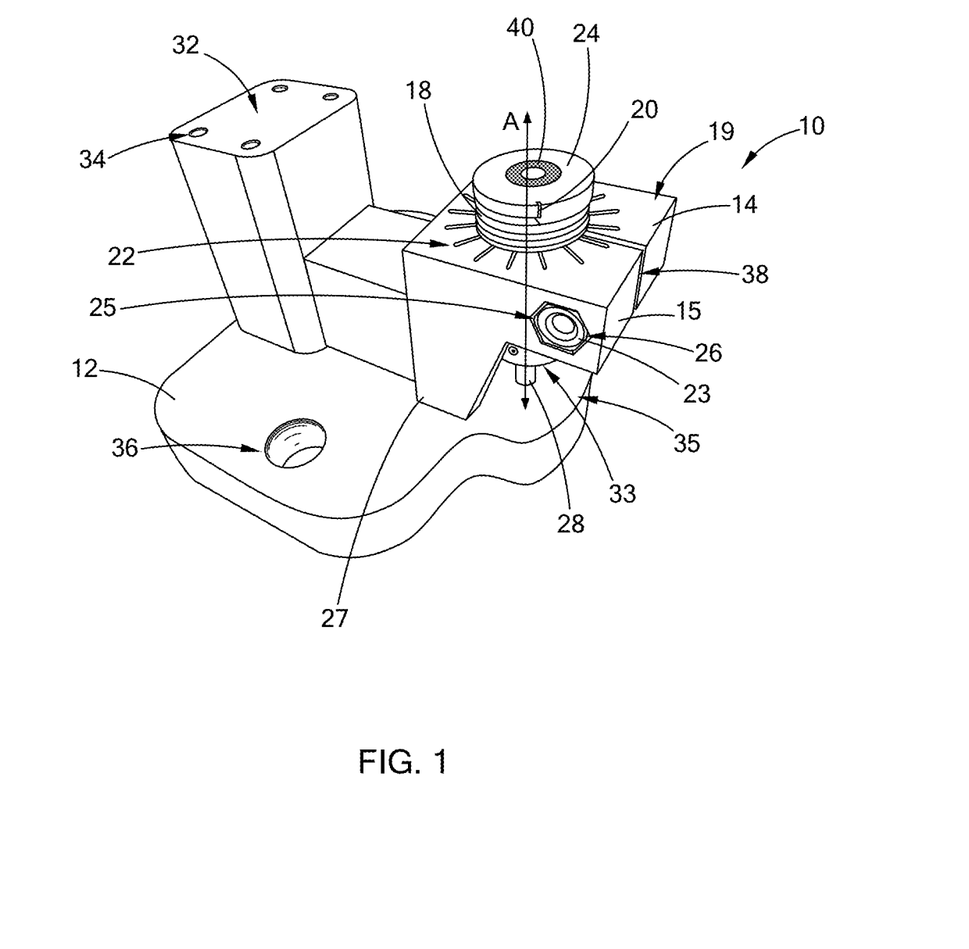
FIG. 1 is a front perspective view of a locating fixture constructed according to the teachings of the present disclosure.
Figure 2:
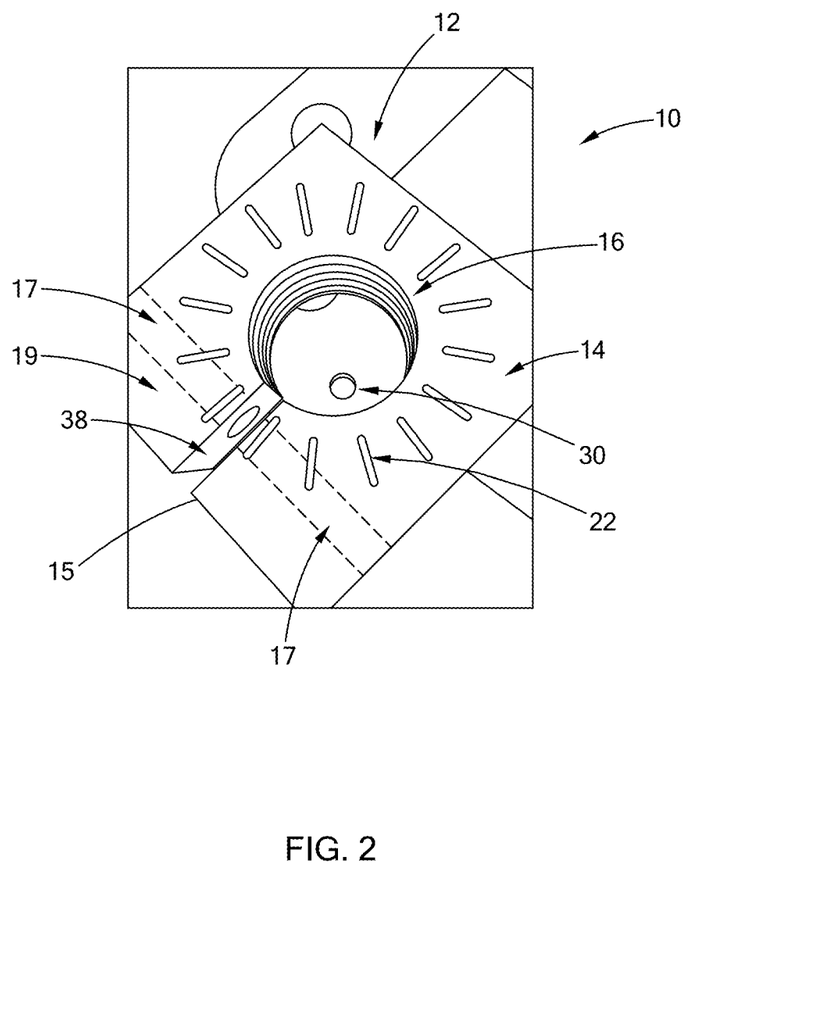
FIG. 2 is an elevational plan view of the top of the locating fixture of FIG. 1 according to the teachings of the present disclosure.
Figure 3:
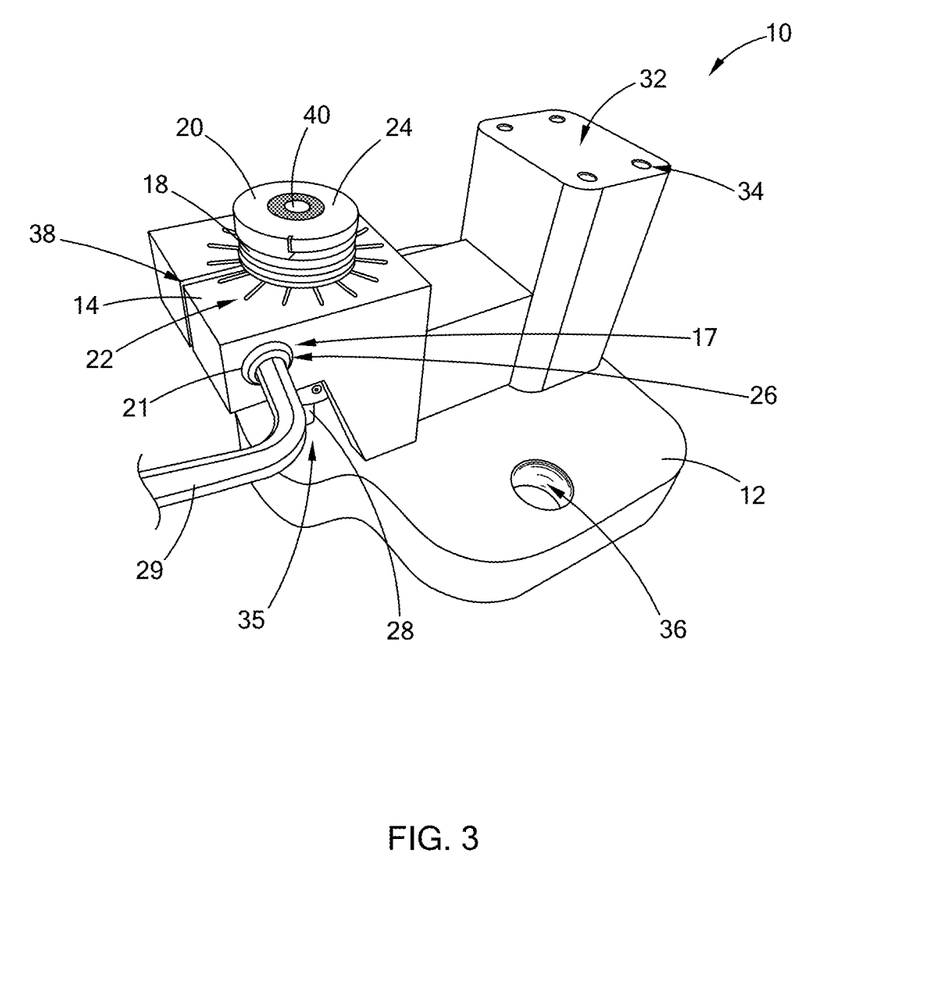
FIG. 3 is a rear perspective view of the locating fixture of FIG. 1 according to the teachings of the present disclosure.

As shown in FIGS. 1-3, a locating fixture 10 according to the teachings of the present disclosure includes a base 12 with a raised platform 14. The raised platform 14 includes a mounting aperture 16 to receive an adjustable locating member 18. The aperture 16 may be threaded to receive corresponding mating threads on the adjustable locating member 18, thereby allowing for rotational and translational adjustment of the adjustable locating member 18. The pitch of the threads for mounting the adjustable locating member 18 will dictate an amount of translational movement of the adjustable locating member 18, which in combination with an indicia as described in greater detail below, establishes an amount of adjustment of the adjustable locating member 18. Using a lower thread pitch (or higher thread count per inch) will result in a more precise adjustment of the translational position of the adjustable locating member 18. In one form, the pitch is between about 0.04 mm (0.016 in.) and about 0.06 mm (0.0024 in.). In another form, the pitch is about 0.05 mm. It should be understood that these values are merely exemplary and other thread pitches, among other translational means for the adjustable locating member 18, may be employed while remaining within the scope of the present disclosure. Further, the locating fixture 10 as illustrated herein with its overall geometry is merely one example of a locating fixture 10 designed for a specific part being positioned for measurement and the available space around such part. It should be understood that the locating fixture 10 may take on other geometries but yet still have the innovative adjustable locating member 18 and related features as described herein while remaining within the scope of the present disclosure.

As further shown, a position indicator 20 is located on the adjustable locating member 18 and cooperates with a plurality of indicia 22 located on the raised platform 14 to determine the vertical position along a longitudinal axis A of the adjustable locating member 18. In this form, the position indicator 20 is a notch, and the indicia 22 are raised bars having a contrasting color of black against the white background of the raised platform 14. It should be understood, however, that any type of position indicator and indicia, whether visual, audible, or having other haptic feedback may be employed while remaining within the scope of the present disclosure. Therefore, the notch and raised contrasting bars illustrated herein should not be construed as limiting the scope of the present disclosure.

Figure 4A:
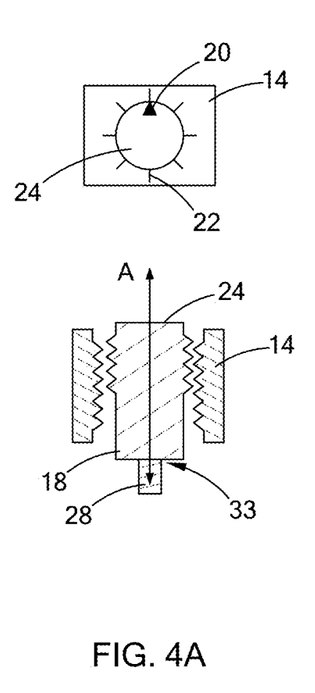
FIGS. 4a, 4b, and 4c are side cross-sectional views of the adjustable locating member as it is adjusted relative to the plurality of indicia, and the corresponding position indicator locations, according to the teachings of the present disclosure.
Figure 4B:
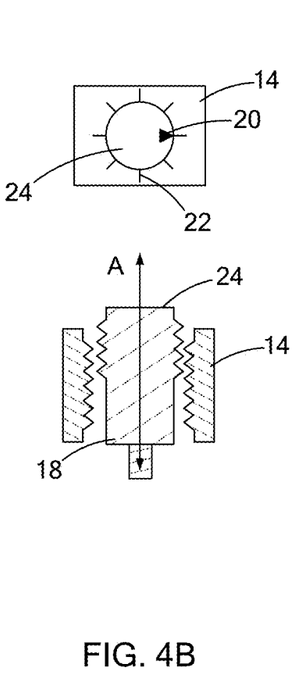
Figure 4C:
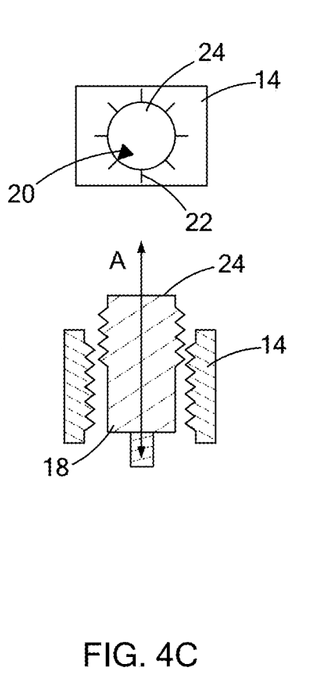

As shown in FIGS. 4a-4c, as the adjustable locating member 18 is rotated, and thus moves longitudinally along axis A, the position indicator 20 aligns with different indicia 22 located on the raised platform 14. When the position indicator 20 aligns with a specific indicia 22, an operator knows the precise vertical position of the adjustable locating member 18, which is specified in a quality procedure/work instructions.

Referring back to FIGS. 1 to 3, the locating fixture 10 also has a restraining member in one form, which tightens the adjustable locating member 18 within the aperture 16 so that the adjustable locating member 18 does not move inadvertently during subsequent and repeated locating and measuring operations. In this form, the restraining member comprises a slotted opening 38 (best shown in FIG. 2) in the raised platform 14 extending from an outer edge 15 to the aperture 16. A through-hole 17 (FIG. 2) is also formed through a ledge portion 19 of the raised platform 14, which receives a bolt 21 and a nut 23, or a nut and bolt assembly 26, as shown. Additionally, a mating recess 25 is formed in a sidewall 27 of the raised platform 14 that matches a shape of the nut 23 (which in this form is a hexagonal shape), in order to lock the nut 23 in place while the bolt 21 is tightened with a tool 29, as shown in FIG. 3. As the bolt 21 is tightened, the slotted opening 38 closes and thus provides a clamping force to restrain the adjustable locating member 18. It should be understood, however, that other methods to restrain the adjustable locating member 18 within the aperture 16 from rotational and translational movement may also be employed, such as by way of example a set screw, while remaining within the scope of the present disclosure.

Figure 7:
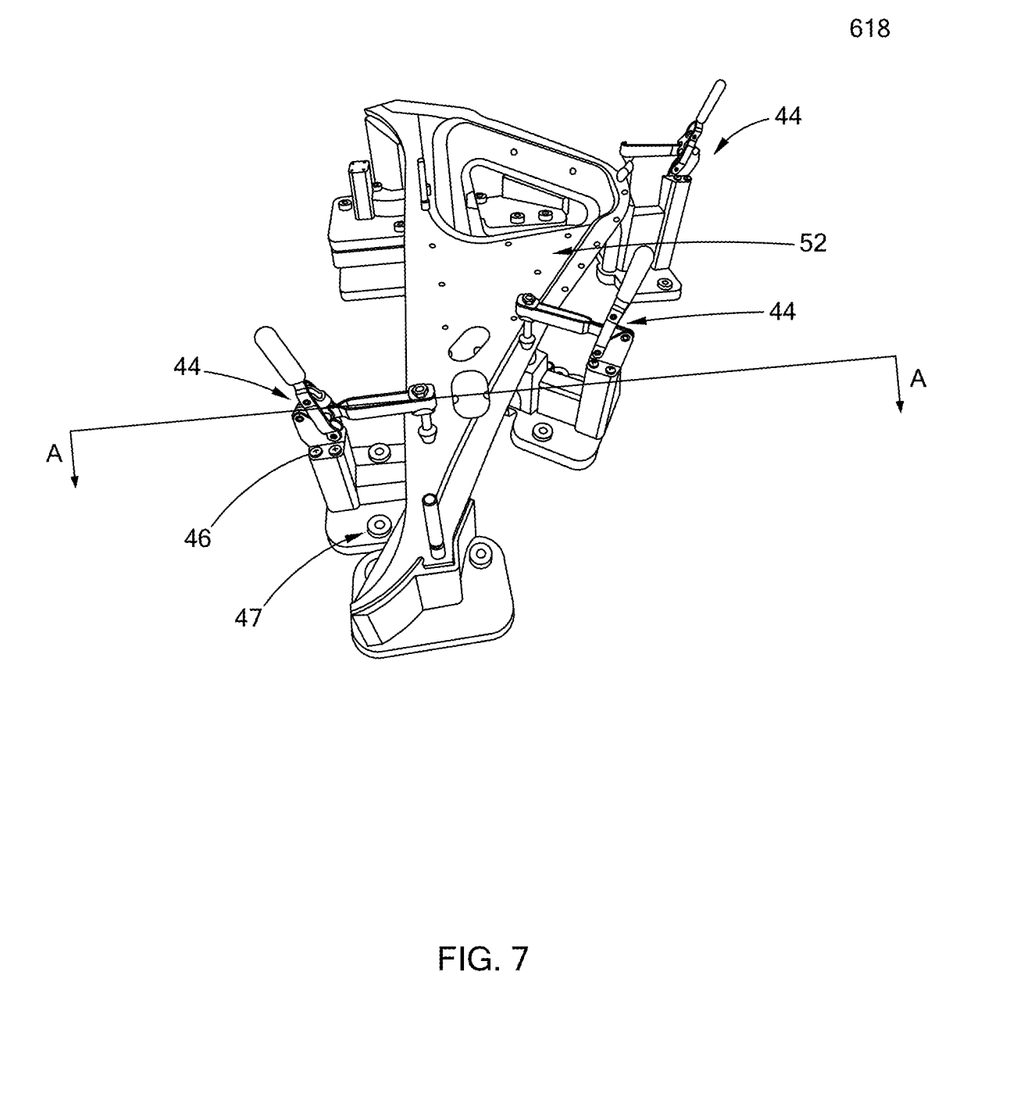
FIG. 7 is a perspective view of a plurality of locating fixtures locating a part according to the teachings of the present disclosure.
Figure 8:
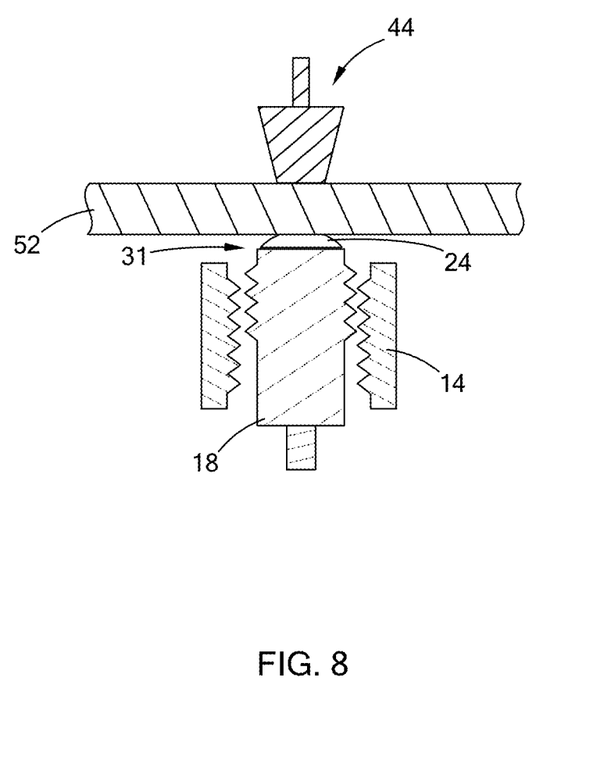
FIG. 8 is a cross-sectional view of a part being positioned between the adjustable locating member and a clamp according to the teachings of the present disclosure.

The adjustable locating member 18 also has a part locating feature 24 adjacent to a proximal end 31 (FIG. 8). As described in greater detail below, the part locating feature 24 is a contact point or surface, or a locating datum, for a part 52 (FIGS. 7 and 8) placed on the locating fixture 10 for measurement. The part locating feature 24 can be any geometry suitable for ensuring contact with the part 52 and may be flat, arcuate, or a point (for point contact), among other geometries.

As further shown in FIGS. 1 and 3, the base 12 includes a clamp mounting feature 32. The clamp mounting feature 32 in this form is located on base 12, allowing clamp 44 (FIGS. 6, 7 and 8) to be positioned and secure the part 52 opposite the part location feature 24 without deformation of the part 52. Mounting apertures 34 (FIG. 1), which receive threaded bolts or fasteners 46 (FIG. 7), are provided to mount the clamp 44 to the clamp mounting feature 32. It should be understood that this mounting arrangement is merely exemplary, and the clamp mounting feature 32 can be configured for any clamp 44 selected for use in restraining part 52 to the part locating feature 24. Similarly, the base 12 also may include apertures 36, which receive bolts or fasteners 47 (FIG. 7), for mounting to another platform as part of a larger assembly.

As further shown in FIGS. 1 and 3, the part locating feature 24 may include a target 40 used for teaching a coordinate measuring machine (CMM) or verifying location of the adjustable locating member 18.

The locating fixture 10 can be manufactured with traditional manufacturing such as machining, but additive manufacturing will provide for additional flexibility to adapt the locating fixture 10 to specific part 52 configurations. More specifically, additive manufacturing generally does not provide high-tolerance part geometries, but with the adjustability of the locating fixture 10, and more specifically the adjustable locating member 18 and position indicator 20, precise location of the adjustable locating member 18 can be provided, as well as throughout use of the locating fixture 10 without having to remanufacture any components to bring them within tolerance. The locating fixture 10 may be comprised of a mixture of additive manufactured parts and traditionally manufactured parts to create the locating fixture 10 with at least the adjustable locating member 18 and the raised platform 14 being manufactured with additive manufacturing.

Referring back to FIGS. 1, 3, and 4a in another form, the adjustable locating member 18 includes a stabilizing member 28 extending adjacent to a distal end 33 portion of the adjustable locating member 18. In this form, the stabilizing member 28 is an integral pin on the adjustable locating member 18 disposed within a recess 30 (best shown in FIG. 2) located in base 12. It should be understood that the stabilizing member 28 is not limited to a pin shape and may be any shape or type of stabilizing member while remaining within the scope of the present disclosure. It should be further understood the stabilizing member is not limited to being integrally formed as part of the adjustable locating member 18, but may be a separate part secured to the distal end 33. In one form, the stabilizing member 28 is free to rotate in the recess 30 when the adjustable locating member 18 translates up and down. The stabilizing member 28 is particularly beneficial to stabilize the adjustable locating member 18 when the adjustable locating member 18 is manufactured by an additive manufacturing process.

As further shown in FIGS. 1 and 3, the raised platform 14 is shown elevated above the base 12 such that the base 12 and the raised platform 14 define a cavity 35, or open space. Accordingly, the adjustable locating member 18 and stabilizing member 28 extend within the cavity 35 as shown. Further, the cavity 35 is sized to allow for placement of a dimensional gauge block (not shown) to assist in making macro-adjustments to the adjustable locating member 18.

Figure 5:
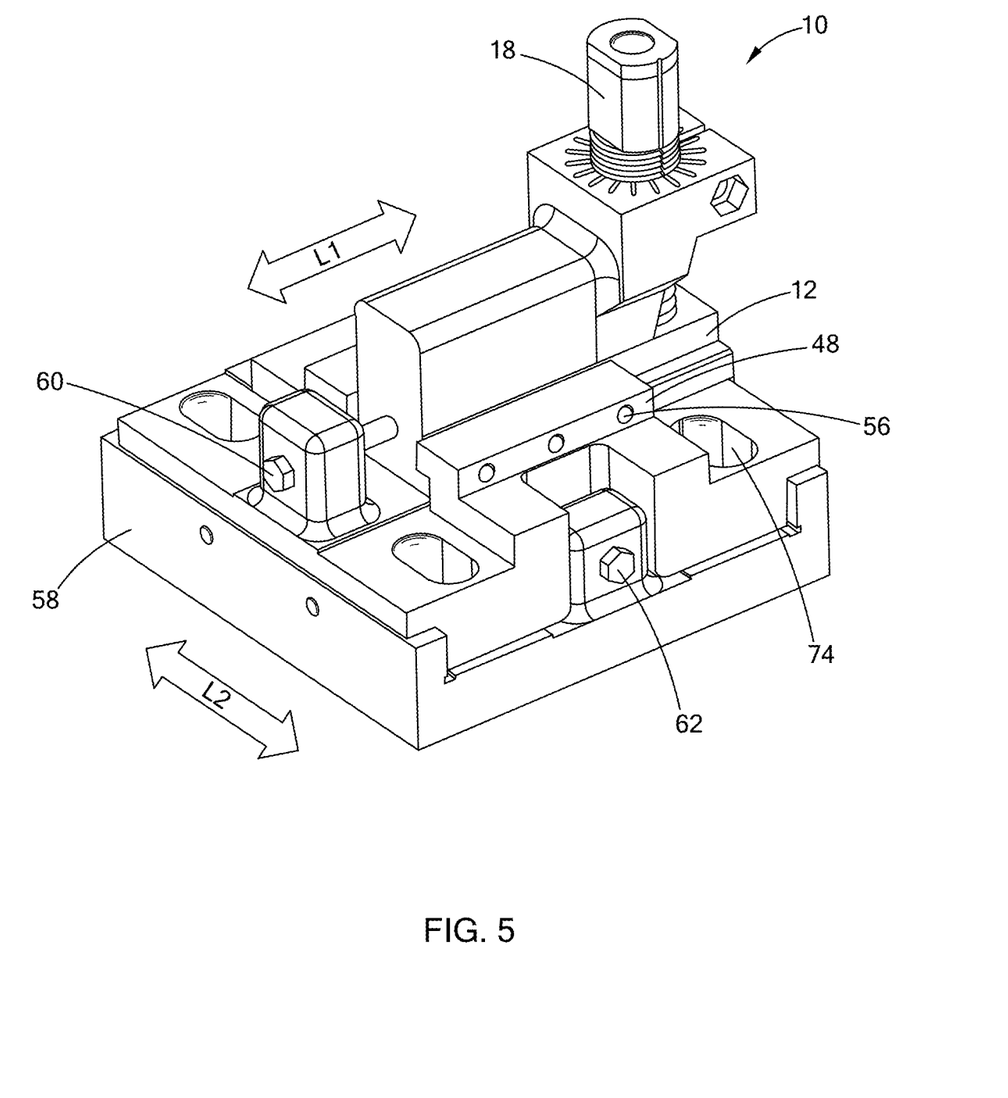
FIG. 5 is a perspective view of a locating fixture including a set of rails and constructed according to the teachings of the present disclosure.
Figure 6:
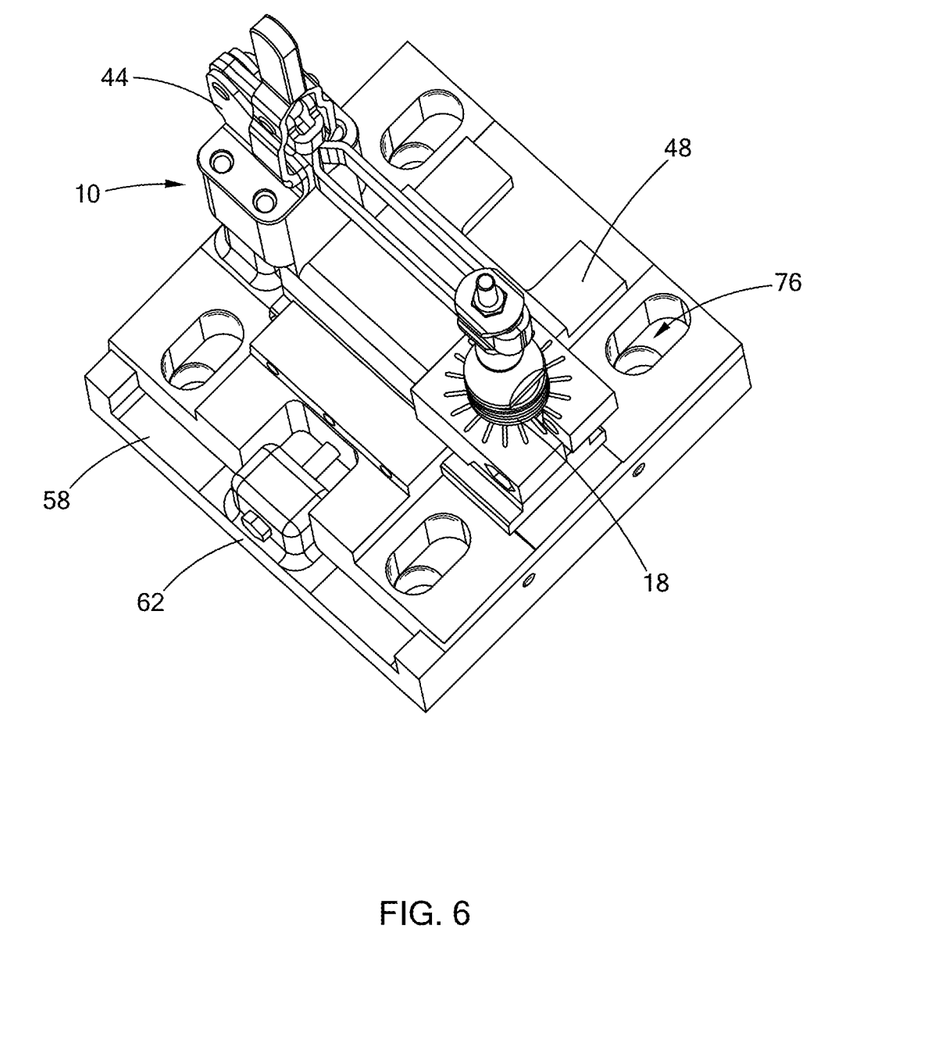
FIG. 6 is elevation plan view of the top of the locating fixture of FIG. 5 according to the teachings of the present disclosure.

Referring now to FIGS. 5 and 6, the locating fixture 10 is shown translatably mounted between a set of rails 48 on support member 58. The base 12 of locating fixture 10 is adjustable along the set of rails 48 in a longitudinal direction L1 using an adjustment feature 60 to control the movement. The adjustment feature 60 in this form is a screw driven system, however it should be understood that this adjustment feature is merely exemplary for adjustment of base 12 within the set of rails 48 and the adjustment feature could be another form such as a piston system without departing from the teachings of this disclosure. Once the desired location of base 12 is determined longitudinally along direction L1 within the set of rails 48, the base 12 is restricted from further movement with at least one securing element 56, which in this form is a set screw. There may be a plurality of securing elements 56 on one or more of the set of rails 48 to restrict the movement of base 12. In another variation, the locating fixture 10 is adjustable in the lateral direction L2 (FIG. 5). In this variation, locating fixture 10 is fixed between the set of rails 48 as described above. The lateral translation of the locating fixture 10 and the set of rails 48 along support member 58 is controlled by an adjustment feature 62. The adjustment feature 62 in this form is a screw driven system, however it should be understood that this adjustment feature is merely exemplary and the adjustment feature could be another form such as a piston system without departing from the teachings of this disclosure. Once the desired lateral location of the set of rails 48 and locating fixture 10 is achieved, aperture 76 (FIG. 6) located on the set of rails 48 in cooperation with fastener 74 (FIG. 5) provide for restraining the set of rails 48 at the desired position.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locating fixture comprising:
   a base including a raised platform having a mounting aperture;
   an adjustable locating member disposed within the mounting aperture and including a part locating feature and a position indicator;
   a plurality of indicia located on the raised platform adjacent to the adjustable locating member, wherein the position indicator cooperates with the plurality of indicia to determine a position of the adjustable locating member;
   a restraining member cooperatively engaged with the adjustable locating member; and
   a clamp mounting area on the base.

2. The locating fixture according to claim 1, wherein the adjustable locating member is rotationally and translationally mounted within the mounting aperture.

3. The locating fixture according to claim 1 further comprising a stabilizing member secured to and extending adjacent a distal end of the adjustable locating member and received within a recess defined in the base.

4. The locating fixture according to claim 1, wherein the restraining member comprises an opening in the raised platform extending from an edge through to the mounting aperture, and a securing member is adjustably mounted within the opening.

5. The locating fixture according to claim 4, wherein the securing member comprises a bolt and a nut assembly.

6. The locating fixture according to claim 1, wherein the part locating feature defines a geometry selected from the group consisting of flat, arcuate or pointed.

7. The locating fixture according to claim 1, wherein at least the raised platform and the adjustable locating member are manufactured with an additive manufacturing process.

8. The locating fixture according to claim 1, wherein the raised platform is elevated above the base to define a cavity between a lower portion of the raised platform and the base.

9. The locating fixture according to claim 1 further comprising a set of rails, wherein the locating fixture is translatably mounted between the set of rails.

10. The locating fixture according to claim 9, wherein the set of rails are configured to allow for longitudinal and lateral directional translation of the locating fixture.

11. The locating fixture according to claim 9 further comprising a support member, wherein the set of rails and the locating fixture are translatable along the support member.

12. The locating fixture according to claim 9 further comprising an adjustment feature to control lateral translation of the locating fixture.

13. An adjustable locating fixture comprising:
- a base including a raised platform having a mounting aperture;
- an adjustable locating member disposed within the mounting aperture and including a part locating feature and a position indicator, wherein the adjustable locating member is rotationally and translationally mounted within the mounting aperture;
- a stabilizing member secured to and extending adjacent a distal end of the adjustable locating member and received within a recess defined in the base;
- a plurality of indicia located on the raised platform adjacent to the adjustable locating member, wherein the position indicator cooperates with the plurality of indicia to determine a position of the adjustable locating member;
- a restraining member cooperatively engaged with the adjustable locating member; and
- a set of rails, wherein the locating fixture is translatably mounted between the set of rails.

14. The adjustable locating fixture according to claim 13, wherein the set of rails are configured to allow for longitudinal and lateral directional translation of the adjustable locating fixture.

15. The adjustable locating fixture according to claim 13 further comprising an adjustment feature to control lateral translation of the adjustable locating fixture.

16. The adjustable locating fixture according to claim 13, wherein the restraining member comprises an opening in the raised platform extending from an edge through to the mounting aperture, and a securing member is adjustably mounted within the opening.

17. The adjustable locating fixture according to claim 13, wherein the part locating feature defines a geometry selected from the group consisting of flat, arcuate and pointed.

18. The adjustable locating fixture according to claim 13, wherein at least the raised platform and the adjustable locating member are manufactured with an additive manufacturing process.

19. An adjustable locating fixture comprising:
- a base including a raised platform having a mounting aperture and a clamp mounting area configured to receive a part clamp;
- an adjustable locating member rotationally and translationally mounted within the mounting aperture and including a part locating feature and a position indicator fixedly attached to the adjustable locating member;
- a plurality of indicia located on the raised platform adjacent to the adjustable locating member, wherein the position indicator cooperates with the plurality of indicia to determine a vertical position along a longitudinal axis of the adjustable locating member; and
- a set of rails, wherein the locating fixture is translatably mounted between the set of rails.

20. The adjustable locating fixture according to claim 19, wherein the set of rails are configured to allow for longitudinal and lateral directional translation of the adjustable locating fixture.

* * * * *